Aug. 13, 1968   R. J. DICKIE ETAL   3,396,925
VIBRATION ISOLATOR

Filed Nov. 8, 1966   3 Sheets-Sheet 1

INVENTORS
ROBERT J. DICKIE
J. PIERRE WILSON
BY Karl A. Ohralik
ATTORNEY

Aug. 13, 1968   R. J. DICKIE ET AL   3,396,925
VIBRATION ISOLATOR

Filed Nov. 8, 1966   3 Sheets-Sheet 2

INVENTORS
ROBERT J. DICKIE
J. PIERRE WILSON
BY *Karl A. Ohralik*

ATTORNEY

United States Patent Office 3,396,925
Patented Aug. 13, 1968

3,396,925
VIBRATION ISOLATOR
Robert J. Dickie, Maywood, and Jean Pierre Wilson, Fort Lee, N.J., assignors to General Precision Systems Inc., a corporation of Delaware
Filed Nov. 8, 1966, Ser. No. 592,937
8 Claims. (Cl. 248—26)

ABSTRACT OF THE DISCLOSURE

Vibration isolators, isoelastic along radial dimensions, are provided by semicircular arches of elastomeric material and wherein the arches are of uniform thickness along any arc portion. For isoelasticity also along the longitudinal axis of the isolator, the ratio of mean radius of the arch to its length must satisfy an equation in terms of the ratio of thickness to length of the arch.

Figure 1:
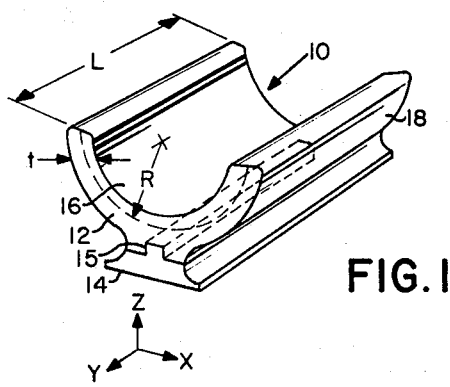

Pluralities of the isolators may be disposed between support members such as concentric rings so as to isolate one of the rings from the vibrations or shock of the other ring.

---

This invention relates to apparatus mountings and, more particularly, to vibration isolators useful for isolating a particular apparatus and maintaining it free of vibrations that may exist in components to which it is secured.

Certain components of high precision, such as gyros and vidicon tubes, for example, are frequently employed in environments wherein a relatively high level of mechanical shock or vibration may exist. Such vibration and shock can be an adverse influence on these components, both in regard to being destructive of the same and in regard to adversely affecting their performance accuracies.

Various proposals have been heretofore made for securing these components by means of soft mountings so as to isolate them with respect to each other. These have, in some measure, been helpful but suffer several significant drawbacks. Frequently it is important or necessary that the vibration isolator have uniform characteristics along two axes of freedom and in other cases in all three axes of freedom so that components, such as gyros, may be operable so as to have uniform isolation along such two or three axes, as the case may be. The prior vibration isolators fail to provide such uniformity and, as a result, vibrations in different directions affect the component differently. This may be a source of inaccuracy in the performance of the unit as a whole.

In addition, the prior vibration isolators have been undesirably bulky, heavy and of high cost. In cases wherein circular ring mounts are provided for holding concentric, circular elements and isolating the same, it has been customary to bond a continuous elastomeric element between the two rings for a cylindrical vibration isolator. Achieving desired stiffness and control of the stiffness in such constructions is difficult, generally requiring considerable trial and error.

Accordingly, it is a principal object of this invention to provide vibration isolation along two or three axes of freedom, as desired.

It is another object of this invention to provide a vibration isolator unit presenting uniform stiffness along two or three mutually perpendicular directions.

It is another object of this invention to provide a circular mounting support presenting uniform stiffness along two or three mutually perpendicular dimensions.

In accordance with this invention an isolator unit, made of an elastomeric substance adaptable to bonding to materials such as aluminum, is provided in the shape of a semicircular arch. In accordance with one feature of the invention, the arch is of semi-annular cross-section so as to present uniform stiffness along two mutually perpendicular axes and in accordance with a further feature of the invention the length of the arch is judiciously determined in relation to other dimensions of the arch so that the unit presents uniform stiffness to forces in all three mutually perpendicular directions. For providing isolating support for a ring, a plurality of the arch units may be equally spaced and disposed between the ring and a supporting structure so that concave surfaces of the units face the ring. The open ends of the units may be bonded to the ring and suitable attaching means, such as a threaded nut, may be embedded in the elastomeric material of the isolator to facilitate threaded attachment to the outer supporting structure.

Figure 2:
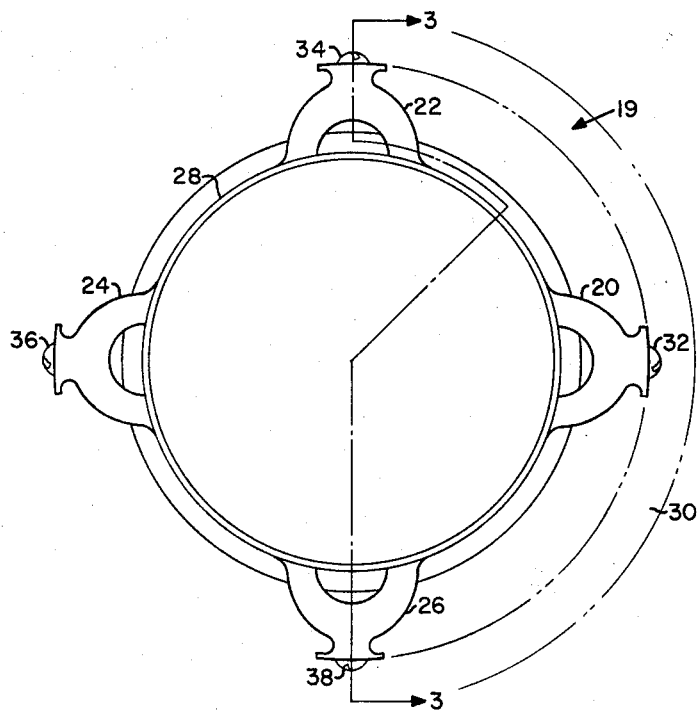
Figure 3:
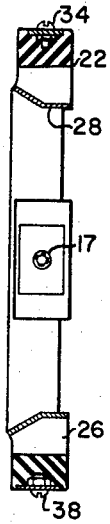
Figure 4:
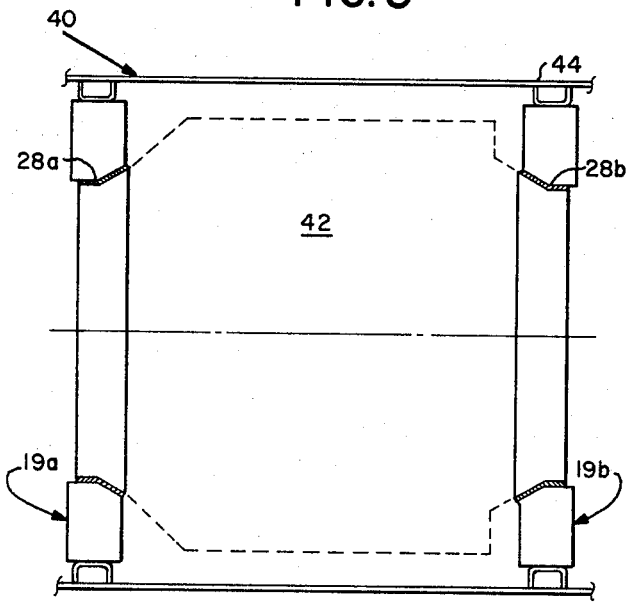
Figure 5:
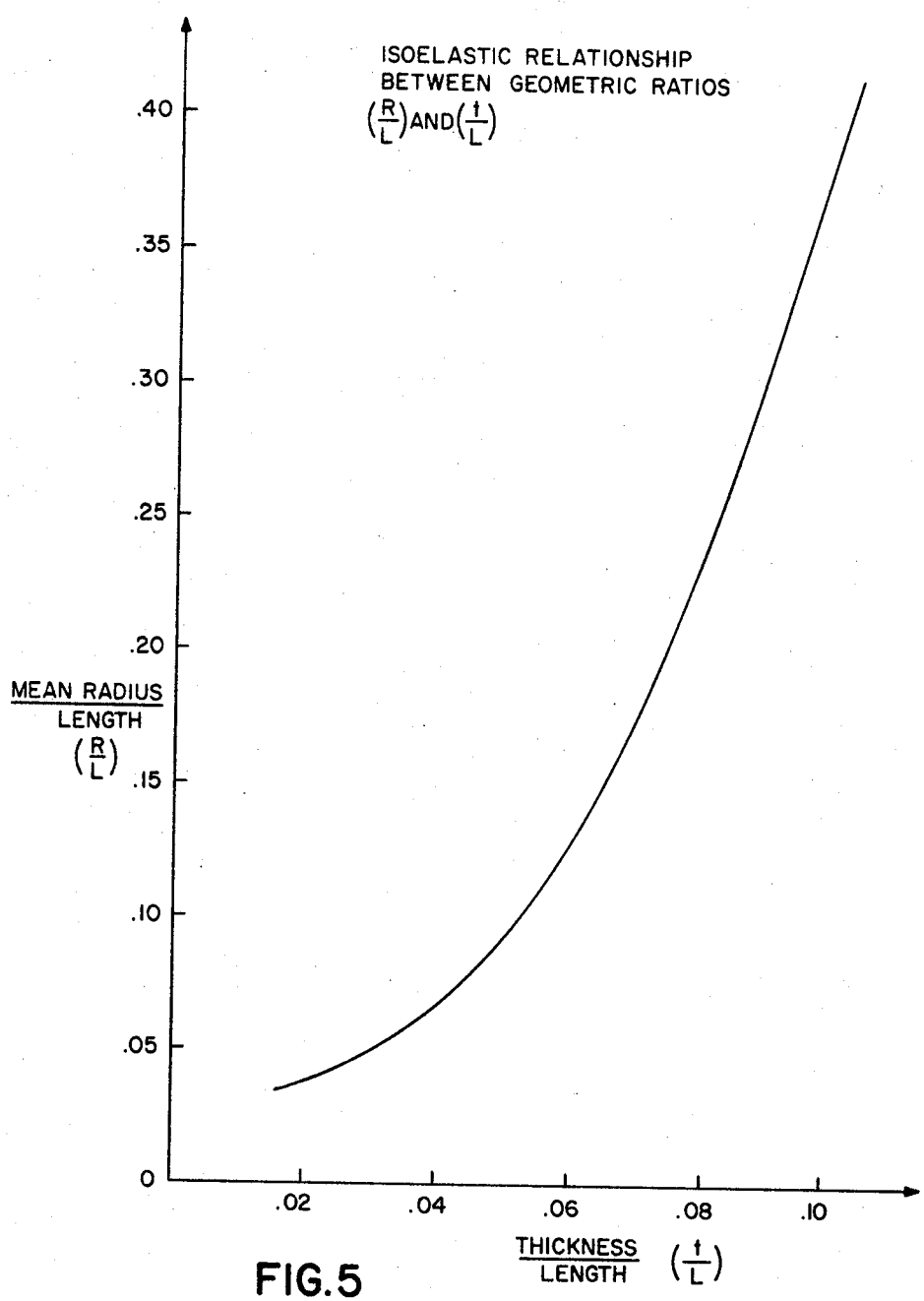

Other and further objects and advantages will appear from a more detailed description of the invention considered with the accompanying drawings, in which:

FIGURE 1 is an isometric view of a vibration isolator unit according to the invention, FIGURE 2 is an end view of an isolator ring mount utilizing a plurality of isolator units as shown in FIGURE 1, FIGURE 3 is a view taken along section 3—3 of FIGURE 2, FIGURE 4 is a side view of a typical gyroscope inertial platform mount having a pair of isolator rings as shown in FIGURE 2 at respective ends thereof, and FIGURE 5 is a graph showing the relationship between geometric ratios.

Referring now more particularly to the drawings for a more detailed description of the invention, in FIGURE 1, 10 represents generally a vibration isolator unit according to this invention and includes an elastomeric arch shaped portion 12 and a supporting base portion 14 substantially coextensive in length with the portion 12. For establishing iso-elasticity in the X and Z directions of the unit 10, the member 12 has an annular cross-section wherein its respective surfaces 16 and 18 are circular in cross-section and have mean radius R. Such a mean radius is the arithmetic average of the radii of curvature of the respective surfaces 16 and 18. The thickness $t$ of the arch is uniform throughout the cross-section except for the base portion 14. The arch 12 of the unit 10 is made of an elastomeric substance of any suitable type, such as butyl rubber, Buna rubber, neoprene, silicone rubber, polyurethane, or natural rubber, all of which possess high vibration energy attenuating qualities. By making this arch section 12 of semi-circular, endwise, cross-section and of uniform thickness throughout its cross-section, it possesses iso-elastic characteristics in the X and Z dimensions.

The arch portion 12 is shown in the drawings as having a rectangular longitudinal cross-section. While such a configuration may be most practical from some standpoints such as molding or formulation or otherwise, the longitudinal cross-section of portion 12 may be elliptical, diamond shaped or of numerous other shapes without departing from the scope and purview of the invention in providing iso-elasticity.

The base portion 14 is of a suitable supporting material, preferably a metal such as aluminum and has a ridge 15 extending along its length and protruding into the body of portion 12. The portions 12 and 14 are preferably rigidly secured as by a suitable bond. At a location intermediate the ends of the portion 14, a threaded opening 17 is provided to facilitate attachment of the isolator to another member.

The particular construction of an isolator unit 10 will depend on various factors such as size and weight of the unit to be supported, allowable space for the isolator, desired stiffness to obtain the desired vibration frequency response of the supported unit, and other factors. However, in any case, for iso-elasticity in two dimensions X and Z, the isolator unit may simply by a semicircular arch. In such a construction, the compliances along X and Z axes are expressed by the following relationship for any general radial cross-section:

$$\frac{\Delta_X}{P_X} = \frac{\Delta_Z}{P_Z} = .0115 \frac{R^3}{EI_2}$$

wherein $$\frac{\Delta_Z}{P_Z}$$

and $$\frac{\Delta_X}{P_X}$$

are the compliances along Z and X axes, respectively
$\Delta_Z$ = deflection along Z axis
$P_Z$ = force causing $\Delta_Z$
$\Delta_X$ = deflection along X axis
$P_X$ = force causing $\Delta_X$
$E$ = Tension/compression modulus of elasticity of material of portion 12
$I_2$ = moment of inertia about an axis through section 12 and parallel to its length.

It should be noted that according to a feature of the invention and as seen by the above equation, iso-elasticity in the two directions X and Z is independent of the particular arch thickness $t$, mean radius R and length L.

In accordance with another important feature of the invention, for establishing complete iso-elasticity of the unit 10, that is, uniform elasticity along axis Y as well as along axes X and Z, the compliance along the Y axis is expressed by the following general equation applicable for any radial cross-section:

$$\frac{\Delta_Y}{P_Y} = .941 \frac{R}{AG} + \frac{.285 R^3}{EI_1} \left[ -.226 \frac{(1+\lambda)^2(\lambda-.559)}{1+4.76\lambda+\lambda^2} + 1 + .25\lambda \right]$$

wherein $\Delta_Y$ = deflection along Y axis
$P_Y$ = force causing $\Delta_Y$
$A$ = area of a longitudinal cross-section
$G$ = shear modulus of elasticity $$\lambda = \frac{EI_1}{KG}$$

$I_1$ = moment of inertia about an axis through section 12 and perpendicular to its length
$K$ = Polar moment of inertia.

In the case wherein the longitudinal cross-section is rectangular and assuming that $E = 3G$, the equations for compliance along the three axes become:

$$\frac{\Delta_Y}{P_Y} = .941 \frac{R}{G\left(\frac{t}{L}\right)L^2} + \frac{1.141 R^3}{\left(G\frac{t}{L}\right)L^4}\left[1+.25\lambda-.226\frac{(1+\lambda)^2(\lambda-.559)}{(1+.25\lambda^2+4.76\lambda)}\right]$$

$$\frac{\Delta_X}{P_X} = \frac{\Delta_Z}{P_Z} = .0460 \frac{R^3}{G\left(\frac{t}{L}\right)^3 L^4}$$

since $$A = \left(\frac{t}{L}\right)L^2$$

$$I_1 = \frac{1}{12}tL^3 = \frac{1}{12}\left(\frac{t}{L}\right)L^4$$

and wherein $$\lambda = \frac{4}{\frac{t^2}{L}\left[5.33-3.36\frac{t}{L}\left(1-\frac{t^4}{12L^4}\right)\right]}$$

For iso-elasticity in three dimensions, the compliances along all three axes are equal, or:

$$\frac{\Delta_X}{P_X} = \frac{\Delta_Z}{P_Z} = \frac{\Delta_Y}{P_Y}$$

whereby $$\frac{R}{L} = \frac{1.435\frac{t}{L}}{\sqrt{1-24.8\left(\frac{t}{L}\right)^2\left[1+.25\lambda-.226\frac{(1+\lambda)^2(\lambda-.559)}{(1+\lambda^2+4.76\lambda)}\right]}}$$

Thus, the ratio, $R/L$, is expressed in terms of the ratio $(t/L)$ since $\lambda$ is also an expression in terms of $t/L$.

The variation of $R/L$ with $t/L$ as expressed by this equation may be graphically shown as illustrated in FIGURE 5 of the drawings. It should be observed that this relationship between $R/L$ and $t/L$ allows considerable flexibility in construction of an isolator 10 while maintaining iso-elasticity along three axes. For example, should the value R be selected or restricted, the values of $t$ and L may be varied over a considerable range while still maintaining the desired stiffness and desired iso-elastic relationship.

In accordance with still another feature of this invention, a plurality of the isolators 10 may be utilized for providing vibration isolation between a ring such as 28 and an outer supporting structure which may also be a ring such as shown at 30. For achieving this end, a plurality of isolators, as shown at 20, 22, 24 and 26 in FIGURE 2 of the drawing, are bonded or otherwise secured to a ring 28. The free ends of the isolator units are preferably bonded to an outer surface of the ring so that the units are concave, facing such ring, and are uniformly spaced about the periphery of such ring. While each isolator unit may be oriented in any position about a radial axis through the center of the ring 28, they are preferably disposed so that the length is parallel to the length of the ring 28, as shown. An outer ring 30, a portion of which is shown in phantom, may be provided and each of the isolators 20–26 is secured to this outer ring by suitable screws 32, 34, 36 and 38 which pass through corresponding openings on the ring and engage threaded nuts, not shown, embedded in the isolators.

As shown more particularly in FIGURE 4 of the drawings, a pair of isolators 19a and 19b, such as shown at 19 in FIGURE 2, may be employed at respective ends of an apparatus 40 used to support a component 42, which may be a gyro, accelerometer, or other such apparatus, and contained in a housing which has a surface complementary to the flanged surfaces of the rings 28a and 28b. Alternatively, in cases wherein the unit 42 is relatively small, a single ring mount such as shown at 19a may be disposed about the unit around its center of gravity. The isolator units 19a and 19b are, in turn, supported peripherally by a frame member 44, which is secured to a space vehicle or some similar such apparatus. In this arrangement, it is noted that the component 42 is maintained in vibration-free relationship with respect to the frame 44 in three axes of freedom. Thus, the interior components of the unit 42 are not adversely affected by the vibrations which, in the absence of the isolators, would be applied to these components or in the absence of iso-elasticity of the isolators would be differentially applied to these interior components.

While the present invention has been described in a preferred embodiment, it will be obvious to those skilled in the art that various modifications can be made therein within the scope of the invention, and it is intended that the appended claims cover all such modifications.

What is claimed is:

1. In combination, a pair of spaced surfaces, a vibration isolator comprising a semicircular arch of elastomeric material having a substantially uniform radial thickness along its length, a rigid member secured to the arch along its outer convex periphery and including attaching means, said arch being disposed between said surfaces with the edges of said arch in contact with one of said surfaces and a portion of the convex surface of said arch in contact with the other of said surfaces.

2. A vibration isolator according to claim 1 wherein the longitudinal cross-section of said arch is rectangular.

3. A vibration isolator according to claim 1 wherein the compliance along axes perpendicular to the arch length is expressed by the equation:

$$\frac{\Delta_X}{P_X} = \frac{\Delta_Z}{P_Z} = .0115 \frac{R^3}{EI_2}$$

wherein $\Delta_X$ = deflection along one axis perpendicular to the length
$P_X$ = force causing $\Delta_X$
$\Delta_Z$ = deflection along the other axis perpendicular to both the length and the first perpendicular axis
$R$ = mean radius of arch
$E$ = Tension/Compression modulus of elasticity
$I_2$ = moment of inertia about an axis through the arch and parallel to its length.

4. A vibration isolator comprising a semicircular arch of elastomeric material having a substantially uniform radial thickness along its length, a rigid member secured to the arch along its outer convex periphery and including attaching means.

5. A vibration isolator comprising a rigid ring, a plurality of circumferentially spaced, elastomeric, semicircular arch shaped members each having a rigid member secured thereto along its outer convex periphery and including attaching means, said arch shaped members being secured to said ring and each having its concave surface facing said ring and the edges of said arch in contact with said ring.

6. A vibration isolator according to claim 5 wherein the compliance along mutually perpendicular axes, X, Y and Z of each of said members is expressed by the equations:

$$\frac{\Delta_X}{P_X} = \frac{\Delta_Z}{P_Z} = .0460 \frac{R^3}{G\left(\frac{t}{L}\right)^3 L^4}$$

$$\frac{\Delta_Y}{P_Y} = .941 \frac{R}{G\left(\frac{t}{L}\right)L^2} +$$

$$\frac{1.141 R^3}{G\left(\frac{t}{L}\right)L^4}\left[1 + .25\lambda - .226\frac{(1+\lambda)^2(\lambda - .559)}{1 + \lambda^2 + 4.76\lambda}\right]$$

wherein $R$ = mean radius of said arch
$t$ = thickness of said arch
$L$ = length of the arch
$G$ = shear modulus of elasticity $$\lambda = \frac{4}{\left(\frac{t}{L}\right)^2\left[5.33 - 3.36\frac{t}{L}\left(1 - \frac{t^4}{12L^4}\right)\right]}$$

7. A vibration isolator according to claim 5 wherein the longitudinal cross-sections of said arches are rectangular.

8. A vibration isolator according to claim 5 wherein the longitudinal axis of each of said members is substantially parallel to the axis of said ring.

References Cited

UNITED STATES PATENTS

| 1,832,368 | 11/1931 | Ell | 248—26 XR |
| 3,162,723 | 12/1964 | McCurtain | 248—22 XR |
| 3,275,275 | 9/1966 | Erhart et al. | 248—358 |

FOREIGN PATENTS

| 957,727 | 8/1949 | France. |

JOHN PETO, *Primary Examiner.*